United States Patent
Crucs et al.

(10) Patent No.: US 7,775,714 B2
(45) Date of Patent: Aug. 17, 2010

(54) METHODS OF ASSESSING PERFORMANCE IN AN IMAGING SYSTEM

(75) Inventors: Kevin M. Crucs, Copley, OH (US); Jim Dycus, San Antonio, TX (US)

(73) Assignee: Crucs Holdings, LLC, Copley, OH (US)

( * ) Notice: Subject to any disclaimer, the term of this patent is extended or adjusted under 35 U.S.C. 154(b) by 180 days.

(21) Appl. No.: 12/108,722

(22) Filed: Apr. 24, 2008

(65) Prior Publication Data

US 2009/0268876 A1 Oct. 29, 2009

(51) Int. Cl.
G01D 18/00 (2006.01)
H05G 1/58 (2006.01)
G01N 23/04 (2006.01)

(52) U.S. Cl. .......................... 378/207; 378/18; 378/116

(58) Field of Classification Search ................... 378/18, 378/115, 116, 207
See application file for complete search history.

(56) References Cited

U.S. PATENT DOCUMENTS

| | | | | |
|---|---|---|---|---|
| 4,649,561 | A * | 3/1987 | Arnold | 378/207 |
| 4,882,494 | A | 11/1989 | Rogers et al. | |
| 4,954,972 | A | 9/1990 | Sullivan | |
| 6,454,460 | B1 | 9/2002 | Ramanathan et al. | |
| 6,471,399 | B1 | 10/2002 | Zylka et al. | |
| 6,505,966 | B1 | 1/2003 | Guru | |
| 6,630,938 | B1 | 10/2003 | Nanni | |
| 7,006,600 | B1 | 2/2006 | Krema et al. | |
| 7,027,160 | B2 | 4/2006 | Sperling | |
| 7,125,166 | B2 * | 10/2006 | Eck et al. | 378/207 |
| 7,189,000 | B2 | 3/2007 | Miyauchi et al. | |
| 7,391,892 | B2 * | 6/2008 | Gerwin | 382/128 |
| 7,467,892 | B2 * | 12/2008 | Lang et al. | 378/207 |
| 2002/0085664 | A1 | 7/2002 | Bromberg et al. | |
| 2004/0109528 | A1 | 6/2004 | Nukui et al. | |
| 2004/0196960 | A1 | 10/2004 | Tanigawa et al. | |
| 2005/0067578 | A1 | 3/2005 | Ueno et al. | |
| 2006/0049358 | A1 | 3/2006 | Oumi et al. | |
| 2006/0088140 | A1 | 4/2006 | Fahrig et al. | |

OTHER PUBLICATIONS

Peter Mah DMD, W. Doss McDavid Phd., "Digital Sensor Evaluation," University of Texas Health Science Center San Antonio, Nov. 29, 2007.

* cited by examiner

*Primary Examiner*—Edward J Glick
*Assistant Examiner*—Thomas R Artman
(74) *Attorney, Agent, or Firm*—Hahn Loeser & Parks LLP

(57) ABSTRACT

A system, method, and computer readable medium for facilitating the assessment of performance quality of an imaging system having a sensor subsystem. An imaging mode of operation of the imaging system is selected and at least one current set of digital image data of an imaging phantom device is acquired with the imaging system via the sensor subsystem. The currently acquired set of digital phantom image data is automatically compared to at least one previously acquired set of digital phantom image data representing a standard image of quality corresponding to the selected imaging mode of operation and the imaging phantom device to automatically determine if at least one sensor parameter of the sensor subsystem has changed.

23 Claims, 6 Drawing Sheets

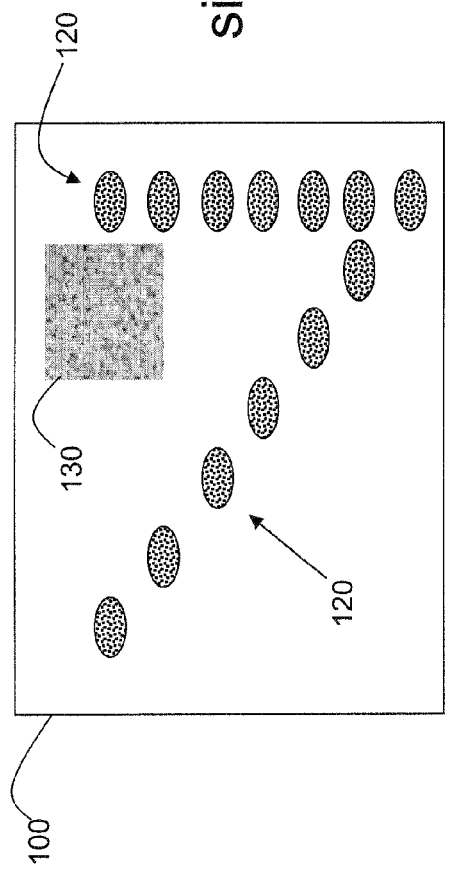
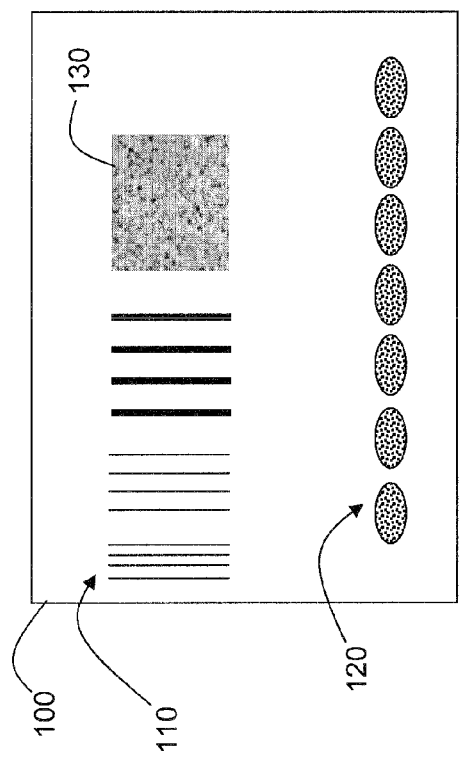
FIG. 1A
FIG. 1B

FIG. 2

Imaging Parameters
- penetration
- spatial resolution
- contrast resolution
- sensitivity
- dynamic range
- blur
- noise
- artifacts
- distortion

Sensor Subsystem Parameters
- transmit intensity/power
- KVP
- MA
- exposure time
- gain
- bandwidth
- integration time
- focus
- beamwidth
- dynamic range
- sample rate

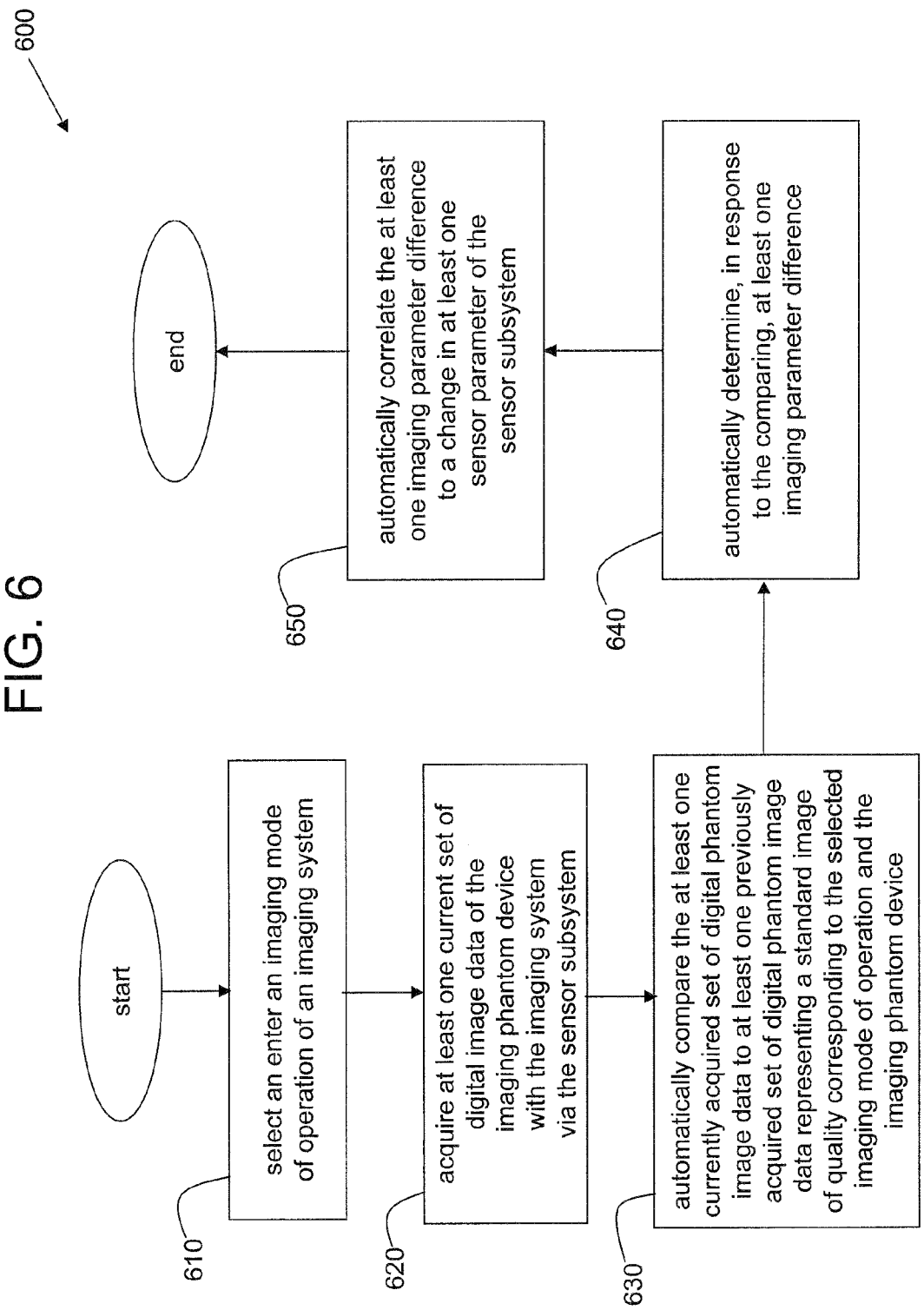

METHODS OF ASSESSING PERFORMANCE IN AN IMAGING SYSTEM

TECHNICAL FIELD

Certain embodiments relate to image quality. More particularly, certain embodiments relate to assessing performance quality of an imaging system having a sensor subsystem by imaging a phantom device.

BACKGROUND

Various types of imaging systems are available for imaging the surface and/or the interior of such diverse entities such as, for example, the human anatomy, animals, man-made physical structures such as welding joints in bridges, geological formations, bodies of water, as well as many others. For example, in the field of medical imaging, various types of sensors exist which are used for acquiring image data of various anatomical portions of the human body.

The image quality produced by an imaging system may degrade over time as various sensor parameter settings of the imaging system are changed by operators or technicians, or as a sensor subsystem of the imaging system degrades over time. For example, an X-ray tube of an X-ray imaging system may, after a certain number of hours of operation, begin to output less X-ray energy due to a degradation in the X-ray tube. Such a degradation in the X-ray tube can show up as a degradation in X-ray image quality such as, for example, less penetration into the body. As a further example, a receiver bandwidth setting of an ultrasound imaging system may be inadvertently changed by an operator for a particular imaging mode, resulting in degraded spatial resolution of images. Image quality degradation may not be noticed immediately by an operator, especially if the degradation occurs gradually over time. Furthermore, once the image quality degradation is noticed, it can be time consuming and difficult to track down the source of the image quality degradation in order to bring image quality back up to a desired level.

Further limitations and disadvantages of conventional, traditional, and proposed approaches will become apparent to one of skill in the art, through comparison of such approaches with the subject matter of the present application as set forth in the remainder of the present application with reference to the drawings.

BRIEF SUMMARY

A first embodiment comprises a method of assessing performance quality of an imaging system having a sensor subsystem, providing at least one imaging mode of operation, and storing at least one previously acquired set of digital image data of an imaging phantom device representing a standard image of quality corresponding to an imaging mode of operation. The method includes:

selecting and entering an imaging mode of operation of the imaging system;

positioning an imaging phantom device with respect to the sensor subsystem;

acquiring at least on current set of digital image data of the imaging phantom device with the imaging system via the sensor subsystem;

automatically comparing the at least one currently acquired set of digital phantom image data to at least one previously acquired set of digital phantom image data representing a standard image of quality corresponding to the selected imaging mode of operation and the imaging phantom device;

automatically determining, in response to the comparing, at least one imaging parameter difference; and automatically correlating the at least one imaging parameter difference to a change in at least one sensor parameter of the sensor subsystem.

The at least one sensor parameter may include one of a transmit intensity setting, an exposure time setting, a sensitivity setting, a resolution setting, and a dynamic range setting of the sensor subsystem. Other sensor parameters are possible as well.

Another embodiment comprises a computer readable medium having encoded thereon computer executable instructions for performing a method of assessing performance quality of an imaging system having a sensor subsystem, providing at least one imaging mode of operation, and storing at least one previously acquired set of digital image data of an imaging phantom device representing a standard image of quality corresponding to an imaging mode of operation, where the method includes:

selecting and entering an imaging mode of operation of the imaging system;

acquiring at least one current set of digital image data of an imaging phantom device with the imaging system via the sensor subsystem;

automatically comparing the at least one currently acquired set of digital phantom image data to at least one previously acquired set of digital phantom image data representing a standard image of quality corresponding to the selected imaging mode of operation and the imaging phantom device;

automatically determining, in response to the comparing, at least one imaging parameter difference; and automatically correlating the at least one imaging parameter difference to a change in at least one sensor parameter of the sensor subsystem.

The at least one sensor parameter may include one of a transmit intensity setting, an exposure time setting, a sensitivity setting, a resolution setting, and a dynamic range setting of the sensor subsystem. Other sensor parameters are possible as well.

A further embodiment comprises an imaging system having a sensor subsystem, an image processor, and a controller, providing at least one imaging mode of operation, and storing at least one previously acquired set of digital image data of an imaging phantom device representing a standard image of quality corresponding to an imaging mode of operation, and having encoded therein computer executable instructions for performing a method of assessing performance quality of the imaging system, wherein the method includes:

selecting and entering an imaging mode of operation of the imaging system;

acquiring at least one current set of digital image data of an imaging phantom device with the imaging system via the sensor subsystem;

automatically comparing the at least one currently acquired set of digital phantom image data to at least one previously acquired set of digital phantom image data representing a standard image of quality corresponding to the selected imaging mode of operation and the imaging phantom device;

automatically determining, in response to the comparing, at least one imaging parameter difference; and automatically correlating the at least one imaging parameter difference to a change in at least one sensor parameter of the sensor subsystem.

The sensor subsystem of the imaging system may include an X-ray tube with associated transmitting circuitry, and an X-ray detector with associated receiving circuitry. The at least one sensor parameter may include one of a KVP (tube kilovolt production) setting of the X-ray tube, a MA (tube current) setting of the X-ray tube, an exposure time setting of the X-ray tube, and a focus or beam width setting of the X-ray tube. The at least one sensor parameter may include one of a gain setting of the X-ray detector and associated receiving circuitry, a bandwidth setting of the X-ray detector and associated receiving circuitry, a dynamic range setting of the X-ray detector and associated receiving circuitry, and an integration time setting of the X-ray detector and associated receiving circuitry. Other sensor parameters are possible as well.

These and other novel features of the subject matter of the present application, as well as details of illustrated embodiments thereof, will be more fully understood from the following description and drawings.

BRIEF DESCRIPTION OF THE DRAWINGS

FIGS. 1A-1B illustrate a schematic diagram of an exemplary embodiment of an imaging phantom device;

FIG. 2 illustrates a table listing a plurality of exemplary imaging parameters and sensor subsystem parameters;

FIG. 6 illustrates a flowchart of a second exemplary embodiment of a method of assessing performance quality of the imaging system of FIG. 3 or FIG. 4 using the imaging phantom device of FIG. 1.

DETAILED DESCRIPTION

Figure 3:
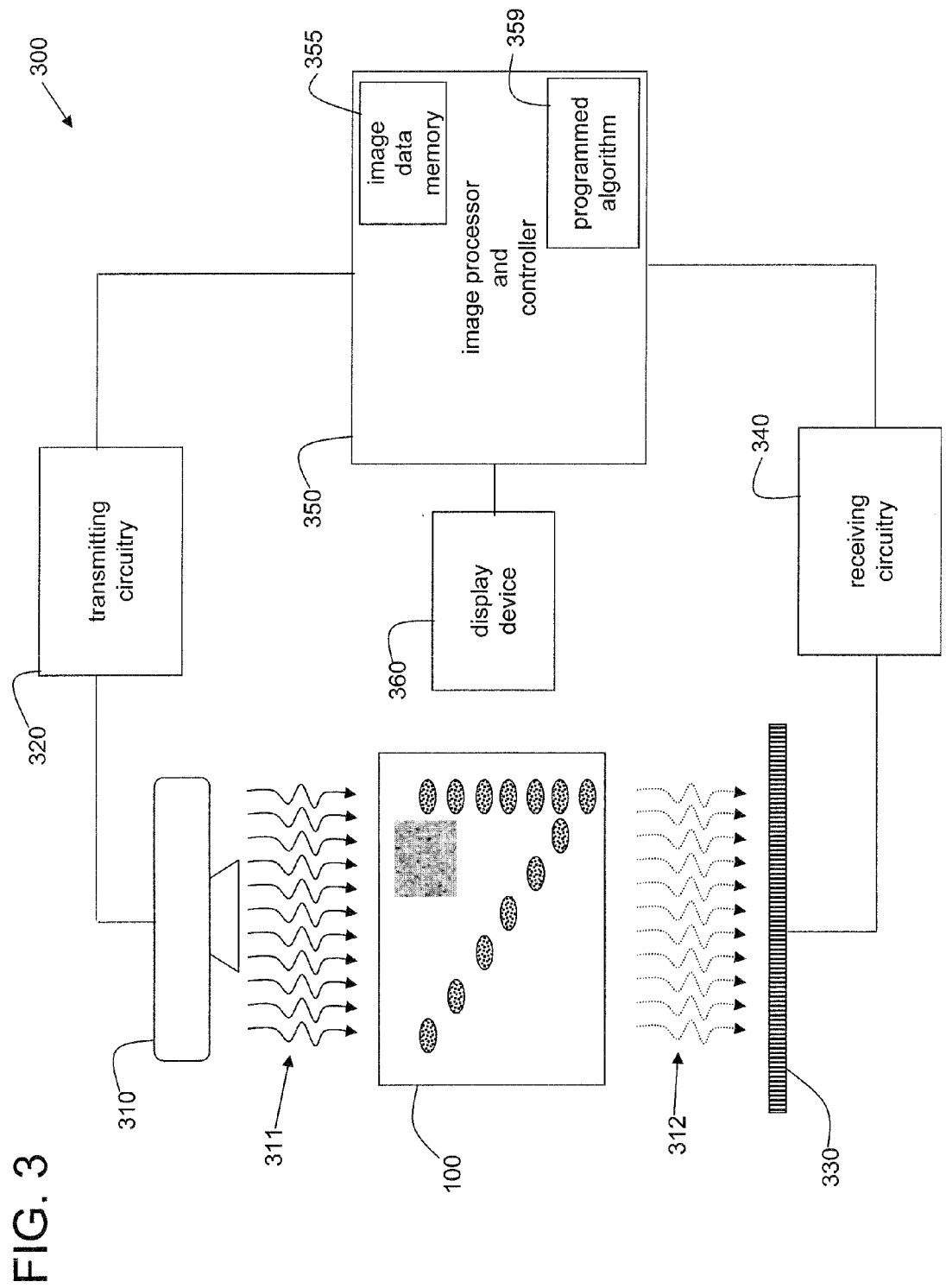
FIG. 3 illustrates a schematic diagram of a first exemplary embodiment of an imaging system having a sensor subsystem, providing at least one imaging mode of operation, and at least one previously acquired set of digital image data of the imaging phantom device of FIG. 1 stored in memory and representing a standard image of quality.

The following description is presented in the context of medical X-ray imaging and medical ultrasound imaging. However, various embodiments may be applied to other imaging fields as well such as, for example, other branches of medical imaging including magnetic resonance imaging, positron emission tomography, various forms of computed tomography, and others.

FIGS. 1A-1B illustrate a schematic diagram of an exemplary embodiment of an imaging phantom device 100. FIG. 1A shows a side view of the imaging phantom device 100 and FIG. 1B shows a top view of the imaging phantom device 100. The imaging phantom device 100 includes various internal features 110-130. The imaging phantom device 100 shown herein is for illustrative purposes and discussion purposes only and is not meant to correspond to any particular imaging phantom device or any particular imaging modality.

The imaging phantom device 100 may be designed to include various features that, when imaged, allow various imaging parameters to be determined which correlate to various sensor subsystem parameter settings. FIG. 2 illustrates a table listing a plurality of exemplary imaging parameters and sensor subsystem parameters. Such imaging parameters may include penetration, spatial resolution, contrast resolution, sensitivity, and dynamic range. Other imaging parameters are possible as well such as, for example, blur, noise, artifacts, and distortion. Such imaging parameters are well-known in the art.

Such sensor subsystem parameters may include, for example, a transmit intensity/power setting of the sensor subsystem, an exposure time setting of the sensor subsystem, a gain setting of the sensor subsystem, a bandwidth setting of the sensor subsystem, and a dynamic range setting of the sensor subsystem. Other sensor subsystem parameters are possible as well such as, for example, a KVP (kilo-volt production) setting, a MA (tube current) setting, an integration time setting, a focus or beamwidth setting, and a sample rate setting of the sensor subsystem. Such sensor subsystem parameters are well-known in the art.

For example, for an X-ray imaging system, the sensor subsystem may include an X-ray tube and an X-ray detector, along with the corresponding transmitting circuitry and receiving circuitry. In such an X-ray imaging system, one sensor subsystem parameter may include a KVP (kilo-volt production) setting or an MA (tube current) setting of the X-ray tube, which affect penetration. Another sensor subsystem parameter may include an exposure time setting of the X-ray tube, or a gain setting, an integration time setting, or a bandwidth setting of the X-ray detector and receiving circuitry, which affect sensitivity.

Another sensor subsystem parameter may include a focus setting or a beamwidth setting of the X-ray tube and transmitting circuitry, or a bandwidth setting of the X-ray detector and receiving circuitry, which affect spatial resolution. A further sensor subsystem parameter may include a dynamic range setting of the X-ray detector and receiving circuitry, which affect contrast resolution.

Referring to FIGS. 1A-1B, the feature 110 of the imaging phantom device 100 may include a set of line pairs which allow determination of sensor subsystem spatial resolution when imaged. Spatial resolution is related to transmit focusing and receiver bandwidth of a sensor subsystem. Similarly, the feature 120 may include a set of radiation absorbing volumes, staggered over a depth of the phantom device 100, which allow determination of sensor subsystem penetration and/or sensitivity. Penetration is related to transmit intensity of a sensor subsystem. Sensitivity is related to gain, integration time, and bandwidth of a sensor subsystem. Furthermore, the feature 130 may include a volume of varying density and attenuation which allows determination of sensor subsystem dynamic range. Dynamic range affects the contrast resolution of a sensor subsystem. Other features may be included in the imaging phantom device 100 as well for helping to determine various imaging parameters. Imaging phantom devices are well-known in the medical sensor imaging art as well as other sensor imaging arts as well.

FIG. 3 illustrates a schematic block diagram of a first exemplary embodiment of an imaging system 300 having a sensor subsystem, providing at least one imaging mode of operation, and at least one previously acquired set of digital image data of the imaging phantom device 100 of FIG. 1 stored in image data memory and being representative of a standard image of quality. The sensor subsystem of the imaging system 300 includes an X-ray tube 310, transmitting circuitry 320 operationally connected to the X-ray tube 310, an X-ray detector or sensor 330, and receiving circuitry 340 operationally connected to the X-ray detector 330. Such X-ray tubes, transmitting circuitry, X-ray detectors, and receiving circuitry are well known in the art.

The imaging system 300 further includes an image processor and controller 350 operationally interfacing to the transmitting circuitry 320 and the receiving circuitry 340. The image processor and controller 350 is capable of being programmed with computer software instructions for controlling the transmitting circuitry and the receiving circuitry, and for performing image processing and quality assurance functions as described herein. The image processor and controller 350 includes an image data memory 355 for storing acquired digital images. Such image processor and controllers are well known in the art.

The image processor and controller 350 is also programmed with an algorithm 359 which is used to perform at least a portion of the methods to assess performance quality of an imaging system as described herein and, therefore, makes the image processor and controller 350 a unique special purpose image processor and controller, in accordance with an embodiment of the present invention.

The imaging phantom device 100 may be positioned between the X-ray tube 310 and the X-ray detector 330. The X-ray tube 310 is capable of generating X-ray radiation 311 which penetrates through the phantom device 100 such that a resulting attenuated X-ray radiation 312 may be received at the X-ray detector 330. The imaging system 300 further includes a display device 360 for displaying acquired images and for displaying messages and image quality test results to an operator.

Figure 4:
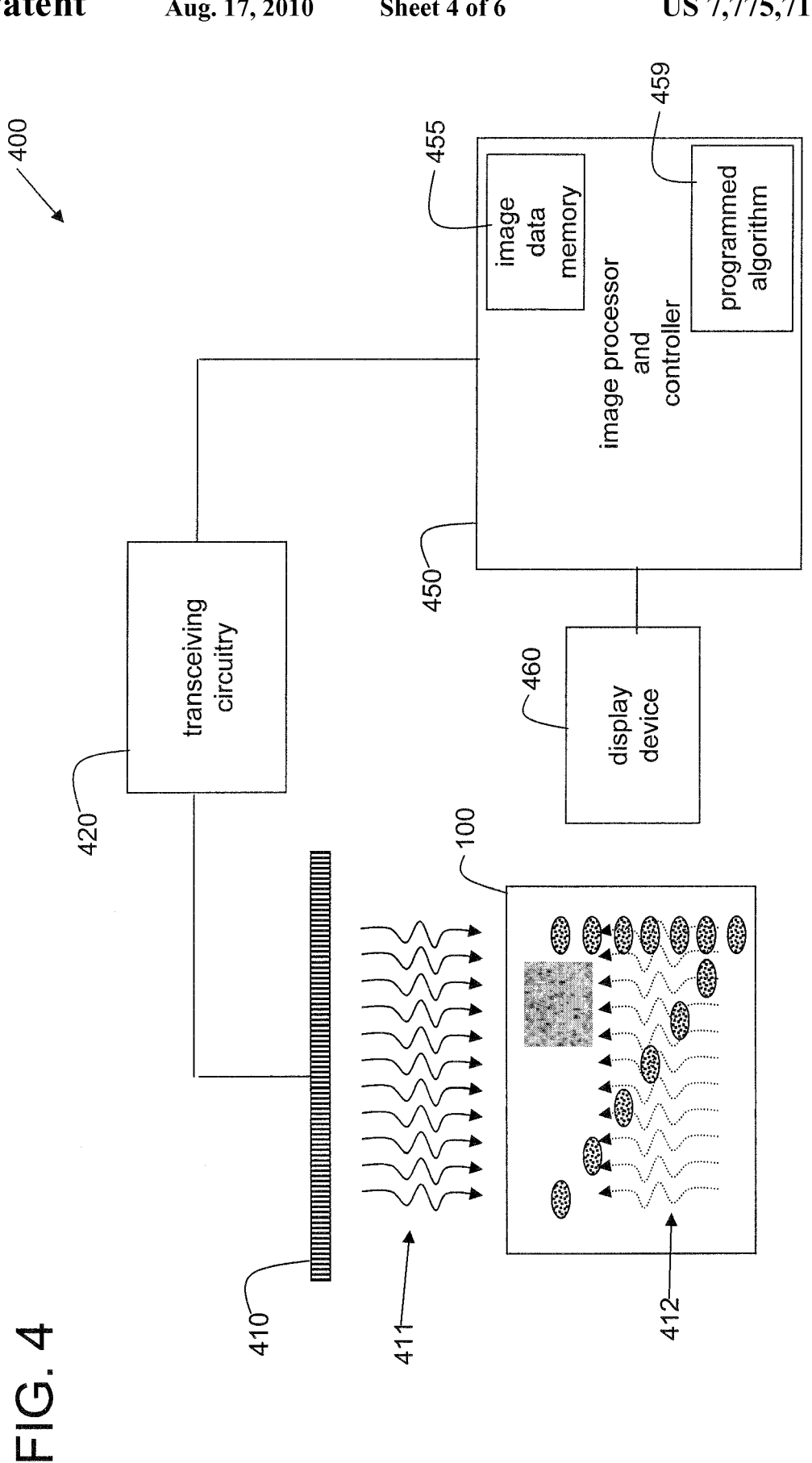
FIG. 4 illustrates a schematic diagram of a second exemplary embodiment of an imaging system having a sensor subsystem, providing at least one imaging mode of operation, and at least one previously acquired set of digital image data of the imaging phantom device of FIG. 1 stored in memory and representing a standard image of quality.

FIG. 4 illustrates a schematic diagram of a second exemplary embodiment of an imaging system 400 having a sensor subsystem, providing at least one imaging mode of operation, and at least one previously acquired set of digital image data of the imaging phantom device of FIG. 1 stored in image data memory and being representative of a standard image of quality. The sensor subsystem of the imaging system 300 includes an ultrasound transducer 410 and transceiving circuitry 420 operationally connected to the ultrasound transducer 410. Such ultrasound transducers and transceiving circuitry are well known in the art.

The imaging system 400 further includes an image processor and controller 450 operationally interfacing to the transceiving circuitry 420. The image processor and controller 450 is capable of being programmed with computer software instructions for controlling the transceiving circuitry, and for performing image processing and quality assurance functions as described herein. The image processor and controller 450 includes an image data memory 455 for storing acquired digital images. Such image processor and controllers are well known in the art.

The image processor and controller 450 is also programmed with an algorithm 459 which is used to perform at least a portion of the methods to assess performance quality of an imaging system as described herein and, therefore, makes the image processor and controller 450 a unique special purpose image processor and controller, in accordance with an embodiment of the present invention.

The imaging phantom device 100 may be positioned with respect to the ultrasound transducer 410. The ultrasound transducer 410 is capable of generating ultrasound energy 411 which penetrates into the phantom device 100 such that a resulting reflected and attenuated ultrasound energy 412 may be received back at the ultrasound transducer 410 in a time delayed manner. Typically, the transducer 410 is placed in physical and acoustic contact with the phantom device 100 in order to couple the ultrasound energy into the phantom device 100. The imaging system 400 further includes a display device 460 for displaying acquired images and for displaying messages and image quality test results to an operator.

Figure 5:
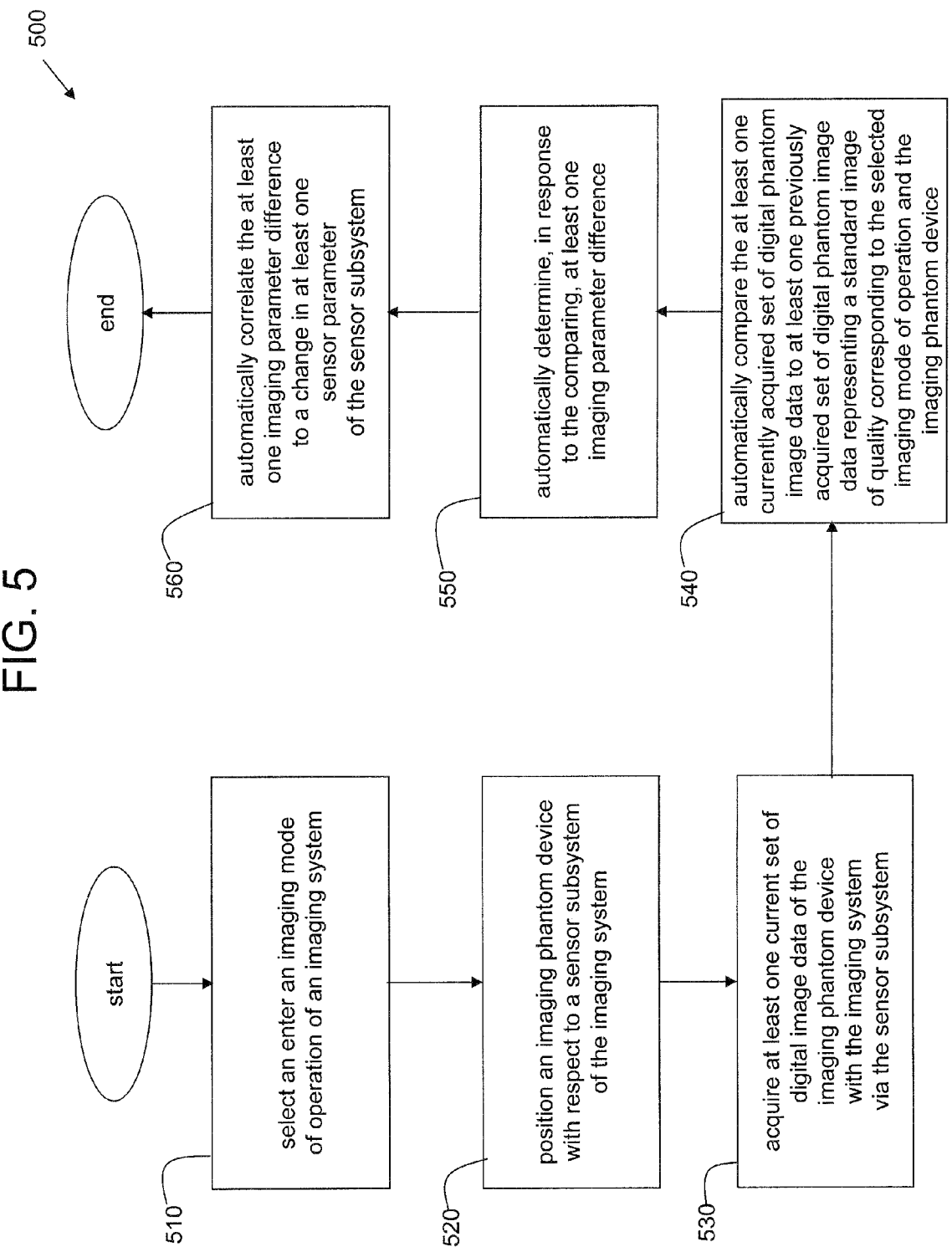
FIG. 5 illustrates a flowchart of a first exemplary embodiment of a method of assessing performance quality of the imaging system of FIG. 3 or FIG. 4 using the imaging phantom device of FIG. 1.

FIG. 5 illustrates a flowchart of a first exemplary embodiment of a method 500 of assessing performance quality of the imaging systems 300 or 400 of FIG. 3 or FIG. 4 using the imaging phantom device 100 of FIG. 1. The method 500 constitutes an image quality assurance test (e.g., the algorithm 359) that may be initiated by an operator or technician of the imaging system. In step 510, select and enter an imaging mode of operation of an imaging system. For example, the imaging modality may be that of medical X-ray and the selected imaging mode of operation may be that of a chest X-ray. In step 520, position an imaging phantom device with respect to a sensor subsystem of the imaging system. In step 530, acquire at least one current set of digital image data of the imaging phantom device with the imaging system via the sensor subsystem. In step 540, automatically compare the at least one currently acquired set of digital phantom image data to at least one previously acquired set of digital phantom image data representing a standard image of quality corresponding to the selected imaging mode of operation and the imaging phantom device. In step 550, automatically determine, in response to the comparing, at least one imaging parameter difference. For example, the imaging parameter difference may correspond to a difference in spatial resolution between the currently acquired data and the previously acquired data (i.e., the standard). In step 560, automatically correlate the at least one imaging parameter difference to a change in at least one sensor parameter of the sensor subsystem. For example, the change in spatial resolution may be automatically correlated to a change in a transmit focus setting of the imaging system.

The previously acquired set of digital phantom image data represents a standard image of quality for the selected imaging mode of operation. The standard image of quality is an acquired image of the phantom device 100 which represents the desired level of image quality (i.e., the established standard) for the selected imaging mode of operation. The previously acquired set of digital phantom image data may have been previously acquired using the exact same or similarly designed phantom device. Furthermore, the previously acquired set of digital phantom image data may have been previously acquired using the exact same or similarly designed imaging system. As a result, a "standard" image representing a desired level of image quality may be stored in the image data memory of an imaging system and later accessed for comparison with a currently acquired phantom image using the method 500.

FIG. 6 illustrates a flowchart of a second exemplary embodiment of a method 600 of assessing performance quality of the imaging system 300 or 400 of FIG. 3 or FIG. 4 using the imaging phantom device 100 of FIG. 1. The method 600 constitutes an image quality assurance test (e.g., the algorithm 459) that may be initiated by an operator or technician of the imaging system. In step 610, select and enter an imaging mode of operation of an imaging system. For example, the imaging modality may be that of diagnostic ultrasound and the selected imaging mode of operation may be that of renal ultrasound. In step 620, acquire at least one current set of digital image data of the imaging phantom device with the imaging system via the sensor subsystem. In step 630, automatically compare the at least one currently acquired set of digital phantom image data to at least one previously acquired set of digital phantom image data representing a standard image of quality corresponding to the selected imaging mode of operation and the imaging phantom device. In step 640, automatically determine, in response to the comparing, at least one imaging parameter difference. For example, the imaging parameter difference may correspond to a difference in penetration between the currently acquired data and the previously acquired data (i.e., the standard). In step 650, automatically correlate the at least one imaging parameter difference to a change in at least one sensor parameter of the sensor subsystem. For example, the change in penetration may be automatically correlated to a change in a transmit power level setting of the imaging system.

The steps 540 and 630 of automatically comparing may include various sub-steps including spatially aligning the currently acquired data with the previously acquired data, and performing automatic measurements of various imaging parameters (e.g., penetration, spatial resolution, contrast resolution, sensitivity, dynamic range, blur, noise, artifacts, and distortion) for both acquired sets of data using various image processing techniques. Once the various imaging parameters have been determined, imaging parameter differences may be calculated.

If an imaging parameter difference is within a specified acceptable range, then no further action may be necessary. However, if an imaging parameter difference is outside of a specified acceptable range, then the imaging parameter difference is automatically correlated to a change in at least one sensor parameter of the sensor subsystem. In accordance with an embodiment of the present invention, the magnitude of the imaging parameter difference and the associated imaging parameter itself determine which sensor parameter(s) the imaging parameter difference gets correlated to. Furthermore, two or more imaging parameter differences detected during the same test may each get correlated to one or more sensor parameters.

In accordance with an embodiment of the present invention, some examples of correlations may include:
- correlating a difference in penetration to a change in transmit intensity/power;
- correlating a difference in spatial resolution to a change in receiver bandwidth;
- correlating a difference in contrast resolution to a change in dynamic range;
- correlating a difference in sensitivity to a change in integration time;
- correlating a change in spatial resolution to a change in focus;
- correlating a change in artifacts to a change in sample rate;
- correlating a change in blur to a change in beamwidth; and
- correlating a change in sensitivity to a change in receiver gain.

Other correlations are possible as well, in accordance with various embodiments of the present invention.

The correlated sensor parameter may be displayed on a display device 360 or 460 to an operator or technician performing the image quality assurance test. The operator or technician may then take action to correct the degradation. The action to be taken may include simply changing the correlated sensor parameter setting, or replacing part of the sensor subsystem (e.g., an X-ray tube). Once an action has been taken, the image quality assurance test may be performed again to verify that the problem has been corrected (i.e., that the standard image quality has been restored).

In summary, a system, method, and computer readable medium for facilitating the assessment of performance quality of an imaging system having a sensor subsystem is disclosed. An imaging mode of operation of the imaging system is selected and at least one current set of digital image data of an imaging phantom device is acquired with the imaging system via the sensor subsystem. The currently acquired set of digital phantom image data is automatically compared to at least one previously acquired set of digital phantom image data representing a standard image of quality corresponding to the selected imaging mode of operation and the imaging phantom device to automatically determine if at least one sensor parameter of the sensor subsystem has changed.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method of assessing performance quality of an imaging system having a sensor subsystem, providing at least one imaging mode of operation, and storing at least one previously acquired set of digital image data of an imaging phantom device representing a standard image of quality corresponding to said at least one imaging mode of operation, said method comprising:
   selecting and entering an imaging mode of operation of said imaging system;
   positioning an imaging phantom device with respect to said sensor subsystem;
   acquiring at least one current set of digital image data of said imaging phantom device with said imaging system via said sensor subsystem;
   automatically comparing said at least one currently acquired set of digital phantom image data to at least one previously acquired set of digital phantom image data representing a standard image of quality and corresponding to said selected imaging mode of operation and said imaging phantom device;
   automatically determining, in response to said comparing, at least one imaging parameter difference; and
   automatically correlating said at least one imaging parameter difference to a change in at least one sensor parameter of said sensor subsystem.

2. The method of claim 1 wherein said at least one sensor parameter is a transmit intensity setting of said sensor subsystem.

3. The method of claim 1 wherein said at least one sensor parameter is an exposure time setting of said sensor subsystem.

4. The method of claim 1 wherein said at least one sensor parameter is a sensitivity setting of said sensor subsystem.

5. The method of claim 1 wherein said at least one sensor parameter is a resolution setting of said sensor subsystem.

6. The method of claim 1 wherein said at least one sensor parameter is a dynamic range setting of said sensor subsystem.

7. A non-transitory computer readable medium having encoded thereon computer executable instructions for performing a method of assessing performance quality of an imaging system having a sensor subsystem, providing at least one imaging mode of operation, and storing at least one previously acquired set of digital image data of an imaging phantom device representing a standard image of quality corresponding to said at least one imaging mode of operation, wherein said method comprises:

selecting and entering an imaging mode of operation of said imaging system;

acquiring at least one current set of digital image data of an imaging phantom device with said imaging system via said sensor subsystem;

automatically comparing said at least one currently acquired set of digital phantom image data to at least one previously acquired set of digital phantom image data representing a standard image of quality and corresponding to said selected imaging mode of operation and said imaging phantom device;

automatically determining, in response to said comparing, at least one imaging parameter difference; and automatically correlating said at least one imaging parameter difference to a change in at least one sensor parameter of said sensor subsystem.

8. The computer readable medium of claim 7 wherein said at least one sensor parameter is a transmit intensity setting of said sensor subsystem.

9. The computer readable medium of claim 7 wherein said at least one sensor parameter is an exposure time setting of said sensor subsystem.

10. The computer readable medium of claim 7 wherein said at least one sensor parameter is a sensitivity setting of said sensor subsystem.

11. The computer readable medium of claim 7 wherein said at least one sensor parameter is a resolution setting of said sensor subsystem.

12. The computer readable medium of claim 7 wherein said at least one sensor parameter is a dynamic range setting of said sensor subsystem.

13. An imaging system having a sensor subsystem, an image processor, and a controller, providing at least one imaging mode of operation, and storing at least one previously acquired set of digital image data of an imaging phantom device representing a standard image of quality corresponding to said at least one imaging mode of operation, and having encoded therein computer executable instructions for performing a method of assessing performance quality of said imaging system, wherein said method comprises:

selecting and entering an imaging mode of operation of said imaging system;

acquiring at least one current set of digital image data of an imaging phantom device with said imaging system via said sensor subsystem;

automatically comparing said at least one currently acquired set of digital phantom image data to at least one previously acquired set of digital phantom image data representing a standard image of quality and corresponding to said selected imaging mode of operation and said imaging phantom device; and automatically determining, in response to said comparing, at least one imaging parameter difference; and automatically correlating said at least one imaging parameter difference to a change in at least one sensor parameter of said sensor subsystem.

14. The imaging system of claim 13 wherein said sensor subsystem includes an X-ray tube with associated transmitting circuitry and an X-ray detector with associated receiving circuitry.

15. The imaging system of claim 14 wherein said at least one sensor parameter is a KVP setting of said X-ray tube of said sensor subsystem.

16. The imaging system of claim 14 wherein said at least one sensor parameter is a MA setting of said X-ray tube of said sensor subsystem.

17. The imaging system of claim 14 wherein said at least one sensor parameter is an exposure time setting of said X-ray tube of said sensor subsystem.

18. The imaging system of claim 14 wherein said at least one sensor parameter is a gain setting of said X-ray detector and associated receiving circuitry of said sensor subsystem.

19. The imaging system of claim 14 wherein said at least one sensor parameter is a bandwidth setting of said X-ray detector and associated receiving circuitry of said sensor subsystem.

20. The imaging system of claim 14 wherein said at least one sensor parameter is a focus setting of said X-ray tube of said sensor subsystem.

21. The imaging system of claim 14 wherein said at least one sensor parameter is a beam width setting of said X-ray tube of said sensor subsystem.

22. The imaging system of claim 14 wherein said at least one sensor parameter is a dynamic range setting of said X-ray detector and associated receiving circuitry of said sensor subsystem.

23. The imaging system of claim 14 wherein said at least one sensor parameter is an integration time setting of said X-ray detector and associated receiving circuitry of said sensor subsystem.

* * * * *